United States Patent [19]

Hammond

[11] Patent Number: 5,482,422
[45] Date of Patent: Jan. 9, 1996

[54] PUSH BACK STORAGE RACK

[76] Inventor: Theodore A. Hammond, 6233 St. Ives Blvd., Orlando, Fla. 32819

[21] Appl. No.: 290,483

[22] Filed: Aug. 15, 1994

[51] Int. Cl.$^6$ .................................................. B65G 1/00
[52] U.S. Cl. ........................... 414/276; 211/151; 414/286
[58] Field of Search .......................... 211/151; 414/276, 414/286

[56] References Cited

U.S. PATENT DOCUMENTS

| | | | |
|---|---|---|---|
| 4,341,313 | 7/1982 | Döring | 211/151 |
| 4,462,500 | 7/1984 | Konstant et al. | 211/151 |
| 4,613,270 | 9/1986 | Konstant et al. | 414/276 |
| 4,687,404 | 8/1987 | Seiz et al. | 414/276 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,988,251 | 1/1991 | Kinney | 414/276 |
| 5,137,159 | 8/1992 | Collins et al. | 211/151 |
| 5,141,118 | 8/1992 | Gay | 211/151 |
| 5,184,738 | 2/1993 | Allen | 211/151 |
| 5,203,464 | 4/1993 | Allen | 211/151 |
| 5,328,038 | 7/1994 | Allen | 211/151 |
| 5,348,169 | 9/1994 | Allen | 211/151 |

Primary Examiner—Leslie A. Braun
Assistant Examiner—Anita M. King
Attorney, Agent, or Firm—Flynn, Thiel, Boutell & Tanis

[57] ABSTRACT

A storage rack arrangement for permitting a plurality of loads to be disposed closely adjacent in aligned front-to-back relationship longitudinally along a generally horizontally elongated storage bay. The storage rack arrangement includes a frame which defines the storage bay and which has a pair of generally parallel support tracks fixedly mounted thereon adjacent opposite sides of the bay. The support tracks are elongated longitudinally along the bay in the front-to-back direction and are slightly downwardly inclined as they project toward a front of the bay. A telescoping carriage assembly is movably mounted on the support tracks and includes at least front and rear carriages which are each adapted to have a load mounted thereon when the front and rear carriages are in an extended position. The rear carriage includes generally parallel side frame elements which are longitudinally elongated, hollow, and open at the front ends thereof. The front carriage includes a generally rearwardly-opening U-shaped frame defined by a front cross frame member which extends sidewardly of the bay and which adjacent opposite ends is rigidly joined to a pair of generally parallel elongated side frame members which are cantilevered rearwardly and which are slidably telescopically engaged and supported within the hollow side frame elements of the rear carriage.

5 Claims, 6 Drawing Sheets

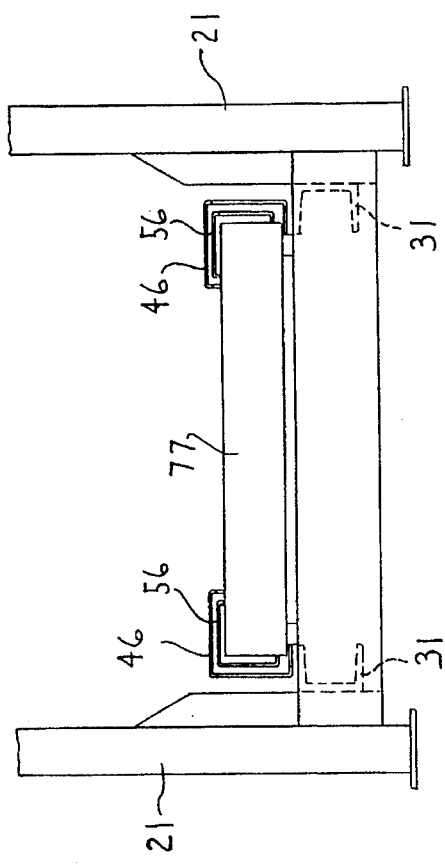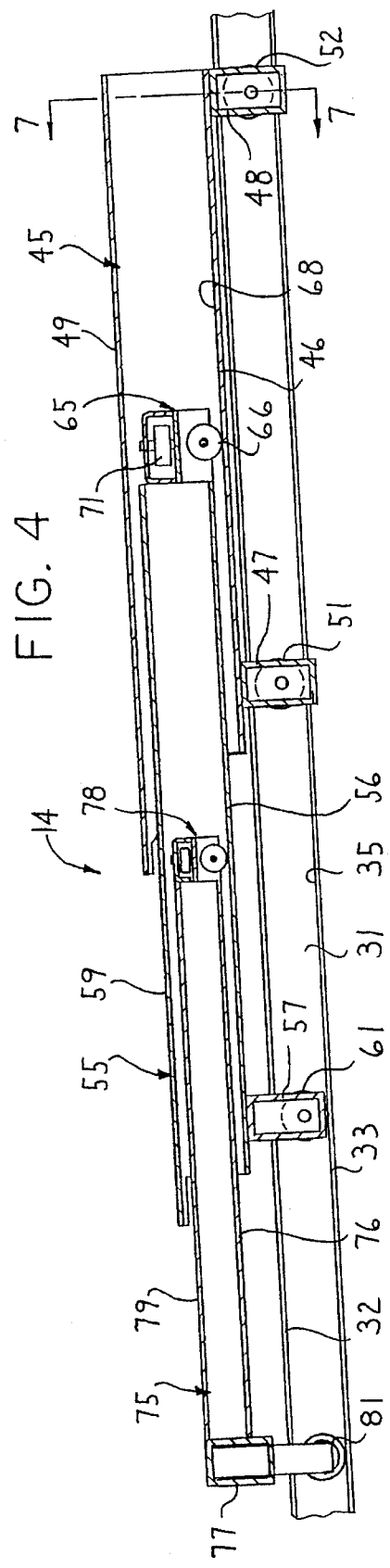

PUSH BACK STORAGE RACK

FIELD OF THE INVENTION

This invention relates to a push back type storage rack for permitting several loads, such as palletized loads, to be positioned in adjacent front-to-back relationship, and more specifically relates to an improved push back rack having improved structural and functional characteristics.

BACKGROUND OF THE INVENTION

Push back storage racks are extensively utilized in warehouses and the like for storage of loads, such as palletized loads. Such storage racks typically permit at least two and quite conventionally three such loads to be stored generally horizontally in adjacent front-to-back relationship. The loads are all moved into and out of the storage rack from a front end thereof. Accordingly, the storage rack typically employs a frame which includes a pair of support tracks which are sidewardly-spaced and extend longitudinally along a storage bay, with the tracks being slightly downwardly sloped as they project forwardly. A primary load-supporting carriage, as well as at least one secondary such carriage, are typically rollingly supported on the tracks, with the primary carriage and its load being stored in a rearward-most position, the secondary carriage and its load being stored in an intermediate position, and a further load being stored directly on the tracks or on the frame in a front position. The primary and secondary carriages are constructed such that the primary carriage normally overlaps or telescopes over the secondary carriage so that both can be stored adjacent the front position of the storage rack when the rack is empty or has only a single load therein, the latter being supported on the primary carriage. When a second load is moved into the storage bay, it is moved inwardly to engage and push the first load and the primary carriage rearwardly to the intermediate position, with the second load being deposited on the secondary carriage. A third load is then similarly inserted into the bay by engaging the load on the secondary carriage and pushing both carriages and their loads rearwardly so that the third load can be deposited directly on the tracks in the front position. Removal of the loads occurs in a reverse sequence, with the carriages moving by gravity downwardly along the tracks so as to return to the front position.

Numerous storage racks of this latter type have been constructed and are in use. Such racks typically utilize a track arrangement having different roller track surfaces for each of the carriages. For example, many of the known storage racks utilize tracks formed similar to I-beams, whereby the rollers for the secondary carriage engage the inner channel of the I-beams, and the rollers for the primary carriage engage the outer channel of the I-beams. With this arrangement, each carriage is also typically provided with four rollers, one being disposed adjacent each corner of the carriage, which rollers engage respective track surfaces. While such arrangements have proven to operate in a generally satisfactory manner, nevertheless the need for multiple track surfaces as a function of the number of carriages, as well as the need for four support rollers on each carriage, increases the overall structural and operational complexity, particularly with respect to the wear and contamination problems created by the additional rollers and specifically the additional exposed track surfaces.

Examples of push back storage racks, many having structural and functional relationships of the type described above, are shown by U.S. Pat. Nos. 4 988 251, 4 955 489, 5 203 464, 5 184 738, 4 949 852, 4 915 240, 4 773 546, 4 687 404, 4 613 270, 4 462 500 and 4 341 313.

Accordingly, it is an object of this invention to provide an improved push back storage rack which is believed to improve upon the structural and operation characteristics of such storage racks, and which is particularly believed to overcome disadvantages associated with prior racks of this general type, as briefly summarized above.

In the present invention, there is provided an improved push back storage rack for permitting at least three loads to be stored in generally horizontally adjacent relationship, such as in adjacent front-to-back relationship along a storage bay. The storage rack includes a frame on which a pair of generally sidewardly-spaced and parallel support tracks are fixedly mounted, which tracks preferably slope slightly downwardly as they project forwardly. A primary carriage is rollingly supported on the tracks and is adapted to have a first load supported thereon. The primary carriage is rollingly movable along the tracks into a rearward-most storage position. At least one secondary carriage is also provided and includes a front frame part provided with rollers which rollingly engage the tracks. The secondary carriages has cantilevered rearwardly projecting frame parts which are telescopically engaged and supported within side frame parts of the primary carriage, whereby the rear of the secondary carriage is supported directly by the primary carriage. With the secondary carriage extended outwardly from the primary carriage, a second load can be supported directly on the secondary carriage, the latter being positionable in an intermediate location along the front-to-back direction of the bay. A third load can be supported directly on the support tracks in a front position when the secondary and primary carriages and their loads are disposed respectively in the intermediate and rear positions. The carriages and their respective loads are moved forwardly into the front position due to the urging of gravity when the frontmost load is removed from the rack.

In the improved storage rack of this invention, as aforesaid, one or more secondary carriages can be provided, each being adapted to have its own load supported thereon. One secondary carriage is telescopically engaged with and projects forwardly from the rear carriage as described above, and the next secondary carriage is of generally the same construction as the first-mentioned secondary carriage but is telescopically engaged with and projects forwardly from the first-mentioned secondary carriage.

In the improved storage rack of this invention, as aforesaid, the carriages can be constructed efficiently and economically utilizing standard structural elements, such as conventional square or rectangular tubing, and at the same time the support tracks are provided with only a single pair of cooperating support surfaces for engagement with the rollers of all of the carriages. Additionally, the secondary carriage or carriages have rollers which engage the tracks only adjacent the front ends thereof, thereby minimizing the number of exposed rollers as well as minimizing the number of required tracks. At the same time the telescopic tubes which define the side rails of the various carriages, and the telescopic relationship therebetween, provides significant strength and rigidity while at the same time providing simple and lightweight structures.

Other objects and purposes of the invention will be apparent to persons familiar with racks of this general type upon reading the following specification and inspecting the accompanying drawings.

BRIEF DESCRIPTION OF THE DRAWINGS

FIG. 3 is a front view of the storage rack, only a single bay being shown for purposes of illustration.

FIG. 4 is a fragmentary side view, partially in cross section, showing the carriage assembly in a partial extended condition.

Figure 1:
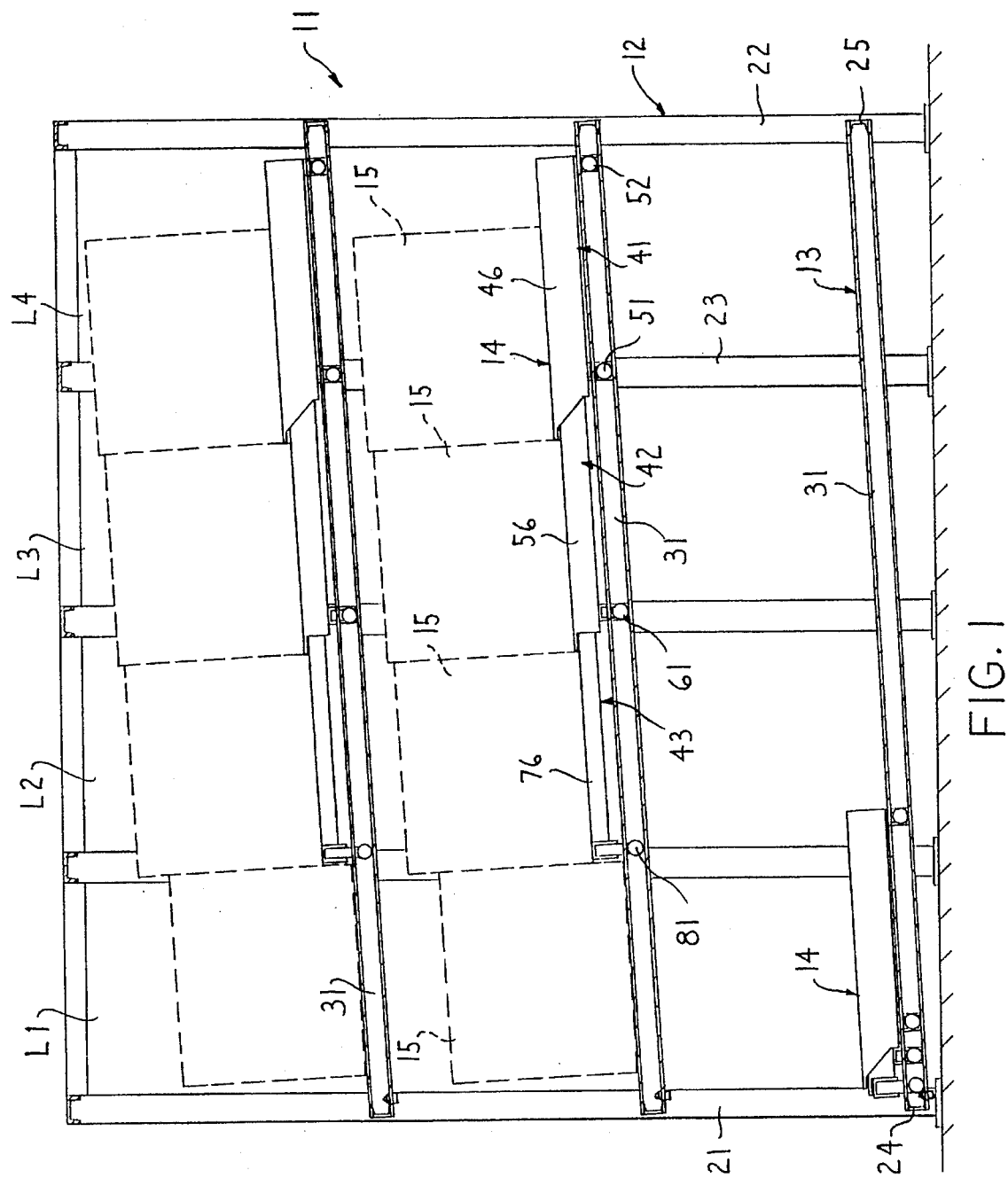
FIG. 1 is a side elevational view of a push back storage rack according to the present invention, which rack in the illustrated embodiment has three storage bays disposed vertically one above another.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the end of the storage rack where loads are inserted or removed, this being the leftward end in FIG. 1, and the word "rear" will refer to the opposite end of the storage rack, namely the rightward end in FIG. 1. The words "inwardly" and "outwardly" will refer to directions toward and away from, respectively, the geometric center of the storage rack and designated parts thereof. Said terminology will include the words specifically mentioned, derivatives thereof, and words of similar import.

DETAILED DESCRIPTION

Referring to FIGS. 1–4, there is illustrated a push back storage rack 11 according to the present invention. This rack includes a generally rigid frame 12 which mounts thereon a track structure 13, the latter being fixed to the frame and projecting generally longitudinally rearwardly at a slight upward slope. This track structure 13 in turn rollingly mounts thereon a load-supporting carriage assembly 14 which is of a generally telescopic construction. The carriage assembly 14, in conjunction with the structure 13, is adapted to support a plurality of loads 15, such as palletized loads, in generally adjacent and aligned relationship generally longitudinally along the track structure in the front-to-back direction of the storage rack. The rack 11 illustrated in FIG. 1 is capable of permitting four such loads 15 to be supported in adjacent aligned relationship within each storage bay, and the overall rack can have multiple bays stacked vertically one above the other if desired, although such is not required.

The frame 12 includes a pair of sidewardly-spaced upright front posts 21, a similarly positioned pair of sidewardly-spaced upright rear post 22, as well as any necessary or desired pairs of sidewardly-spaced intermediate upright posts 23. The cooperating pairs of front and rear posts are respectively rigidly joined together by sideward horizontally extending cross rails or braces 24 and 25. If necessary or desired, longitudinal braces or rails can also be rigidly joined between the posts along each side of the bay, such as between the front and intermediate posts, and between the intermediate and rear posts. The overall construction of the frame can assume many different structural and geometrical relationships, so long as the frame possesses the necessary strength and rigidity.

The track structure 13 for each load bay includes a pair of elongate support tracks 31 which are disposed in sidewardly-spaced but generally parallel relationship. These support tracks 31 extend longitudinally throughout the length of the respective bay in the front-to-back direction and are rigidly secured to the frame, such as by being joined to the cross rails 24 and 25 at the front and rear ends thereof. The support tracks 31, at intermediate locations, can be similarly supported on intermediate cross rails, although in such case the intermediate cross rails are disposed under the support tracks so as to prevent interference with the movement of the carriage system, as will be apparent hereinafter.

The cooperating pair of support tracks 31 are sidewardly-spaced so as to be disposed adjacent opposite sides of the respective bay, and hence are respectively positioned more closely adjacent but inwardly from the support posts which extend along the respective sides of the bay. The support tracks 31 are disposed so that, as they project longitudinally along the bay, they are slightly downwardly inclined as they project forwardly (i.e., right to left in FIG. 1). The downward forward incline of the support tracks 31 is normally a rather small angle, typically a downward slope in the range of from about 3° to about 7°.

Each support track 31, in the illustrated embodiment, is formed by a generally U or channel-shaped member, with these channel-shaped members 31 being oriented so that they open inwardly in opposed relationship to one another. This results in each channel member 31 (see FIG. 7) having top and bottom flanges 32 and 33, respectively, joined by a generally vertically extending web or bight 34. The region between the top and bottom flanges 32 and 33 opens inwardly away from the adjacent side posts, and the lower flange 33 has a top surface 35 which extends longitudinally throughout the length of the support track and functions as a roller-engaging surface for supporting the carriage assembly 14, as described hereinafter.

Considering now the carriage assembly 14, and referring specifically to FIGS. 2–4, this assembly includes a primary carriage 41 which will hereinafter be referred to as the rear carriage, and at least one secondary carriage 42 which will hereinafter be referred to as the intermediate carriage. The carriage assembly 14 of the present invention, in the illustrated embodiment, also includes a further secondary carriage 43 which will hereinafter be referred to as the front carriage. This front carriage 43 has the rear part thereof telescopically engaged with and supported by the intermediate carriage 42, and this latter carriage in turn has the rear part thereof telescopically engaged with and supported by the rear carriage 41. These carriages are movingly supported on the tracks 31, and can be telescopically collapsed when at least the front and intermediate carriages are unloaded so as to permit the entire carriage assembly 14 to be telescoped together so as to occupy only a single load position. When fully extended, however, the carriage assembly 14 effectively defines three load-positions in that each of the carriages 41, 42 and 43 can accommodate a respective palletized load thereon. This three-load carriage assembly 14, in conjunction with the support tracks 31, define a four-load capacity storage bay.

Figure 2:
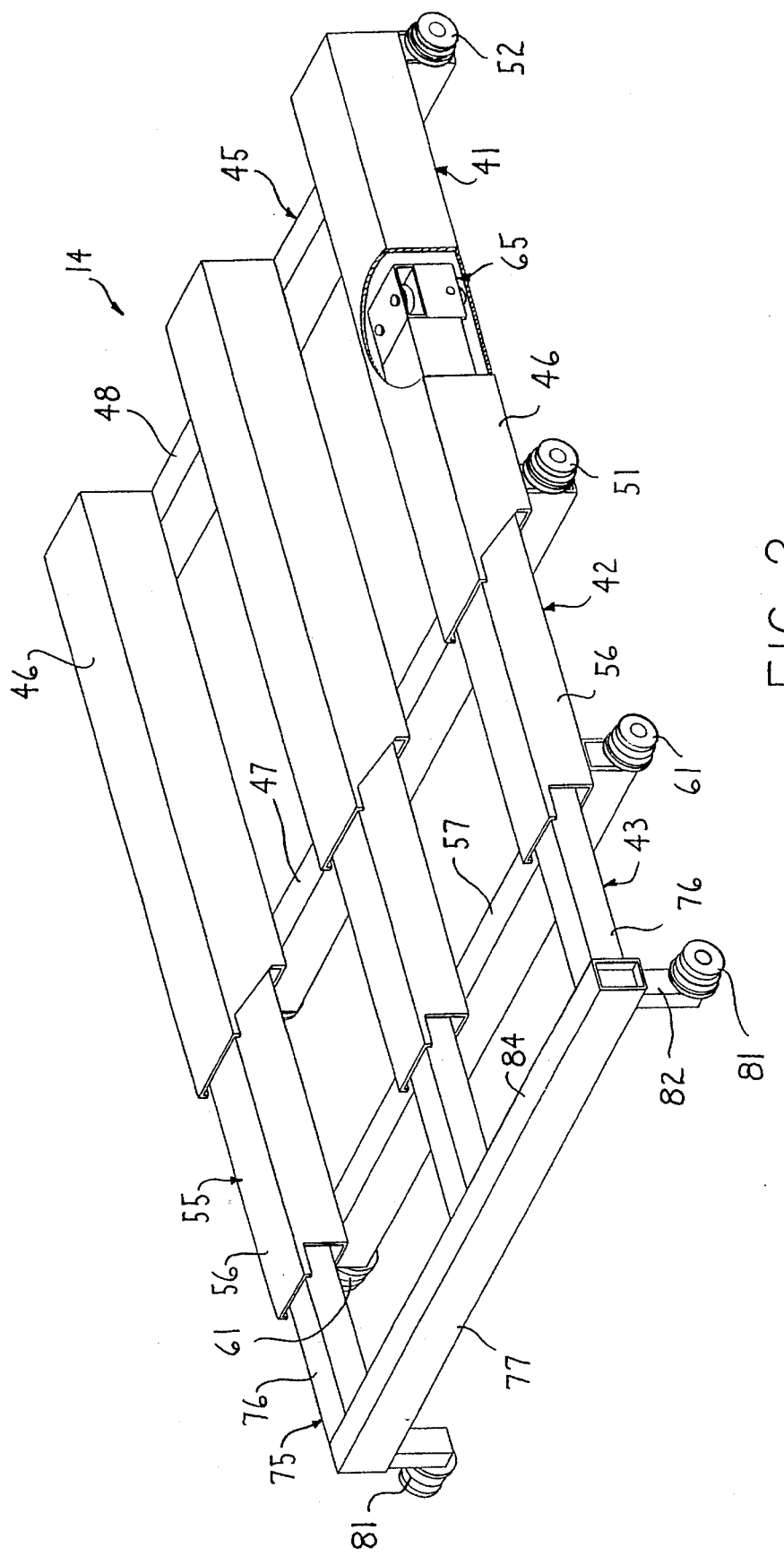
FIG. 2 is a perspective view of the load-receiving carriage assembly associated with the storage rack of the present invention, which assembly is shown in a partially extended condition for purposes of illustration.

As shown by FIG. 2, the rear carriage 41 includes a rigid frame 45 of generally rectangular configuration. This frame 45 includes generally parallel elongate side frame elements 46 which, at opposite ends thereof, are rigidly joined together by generally parallel front and rear cross frame elements 47 and 48, respectively, the latter projecting generally perpendicularly between the side frame elements 46. The side frame elements 46 are constructed as elongate tubular elements, normally of square or rectangular cross section, which tubular elements are open at the forward ends thereof.

The frame 45 has a pair of front rollers 51 which are mounted under the front ends of the side frames 46 so as to be disposed adjacent the front corners of the frame. Similarly, a pair of rear rollers 52 are mounted under the rear ends of the side frames 46 so as to be disposed adjacent the rear corners of the frame. These front and rear rollers 51 and 52 are disposed under the respective side frames 46, and are positioned for rolling and supporting engagement with the pair of support tracks 31. For this purpose, a suitable support plate or bracket 53 is either fixed to the end of the respective cross frame 47, 48 and/or is fixed to and projects downwardly from the respective side frame 46. This brace or bracket 53 mounts thereon a suitable support shaft 54 which is cantilevered outwardly (i.e., sidewardly) and has the respective roller 51 or 52 rotatably supported thereon through an intermediate bearing. By this arrangement the rollers are cantilevered outwardly in a sideward direction so that the rollers can project into the channel-like space defined between the upper and lower flanges 32 and 33 of the respectively adjacent support track 31, whereupon the rollers 51 and 52 are directly supportingly and rollingly engaged with track surface 35. Due to the fact that the pair of opposed support tracks 31 open inwardly toward one another in opposed relationship, this hence confines the rollers 51, 52 which are provided on opposite sides of the rear carriage 41 so as to positively maintain the carriage in confined but rolling engagement with the support tracks 31.

The frame 45 defines an upwardly facing enlarged surface for supporting a load, normally a palletized load. For this purpose the side frames 46 have enlarged and flat coplanar upper surfaces 49 which are generally unobstructed and function as a load-supporting surface. The rear carriage 41, and its support on the tracks 31 by the pairs of front and rear rollers 51 and 52, hence enables the rear carriage to rollingly move along the support tracks 31 throughout the entire length thereof. Since the front and rear ends of the tracks are respectively closed off by the front and rear cross rails 24 and 25, this prevents the rear carriage 41 from becoming disengaged from the support tracks.

Considering now the intermediate carriage 42, same includes a rigid frame 55 which is of a generally U-shaped configuration. This U-shaped frame 55 includes a front cross frame element 57 which extends horizontally sidewardly of the respective bay, and which at its opposite ends is rigidly joined to a pair of rearwardly projecting side frame elements 56. These side frame elements 56 project rearwardly in generally perpendicular relationship from the front frame element 57, and are disposed in generally parallel relationship. The side frame elements 56 are cantilevered rearwardly and terminate in generally free rearward ends, with the sideward region between the side frame elements 56, as disposed rearwardly of the front frame element 57, being generally open.

The intermediate carriage 42 also mounts a pair of front rollers 61 positioned adjacent and under the front corners of the frame 55. For this purpose, a support bracket or brace 62 projects downwardly adjacent each end of the front frame element 57 and has a suitable support shaft 63 cantilevered sidewardly therefrom for supporting the roller 61 thereon through a suitable conventional bearing. The rollers 61 are cantilevered outwardly from opposite sides of the frame adjacent the front corners and project into the opposed channel-shaped support tracks 31 in the same manner described above relative to the rollers 51 and 52.

The U-shaped frame 55 also defines thereon an upwardly-facing load-receiving surface. In this situation the side frame elements 56 have generally flat and coplanar upper surfaces 59 which cooperate to define an upwardly facing surface for accommodating a load thereon, such as a pallet.

As indicated above, the side frame elements 56 are rearwardly cantilevered from the front frame element 57 and terminate in rear free ends. These rearwardly cantilevered side frame elements 56 are oriented such that the longitudinal centerlines thereof are substantially aligned with the longitudinal centerlines of the side frame elements 46 associated with the rear carriage 41. Further, these side frame elements 56 are provided with a exterior cross section which is at least somewhat smaller than the interior cross section of the side frames 46, whereby the cantilevered side frames 56 project rearwardly so as to be telescopically and slidably accommodated within the respective side frames 46. To facilitate the support but telescopic movement of the side frames 56 within the respective side frames 46, each side frame 56 adjacent its rearward free end is provided with a roller arrangement 65 for providing supportive and guiding movement of the rear end of the intermediate carriage 42 on the rear carriage 41.

Figure 8:
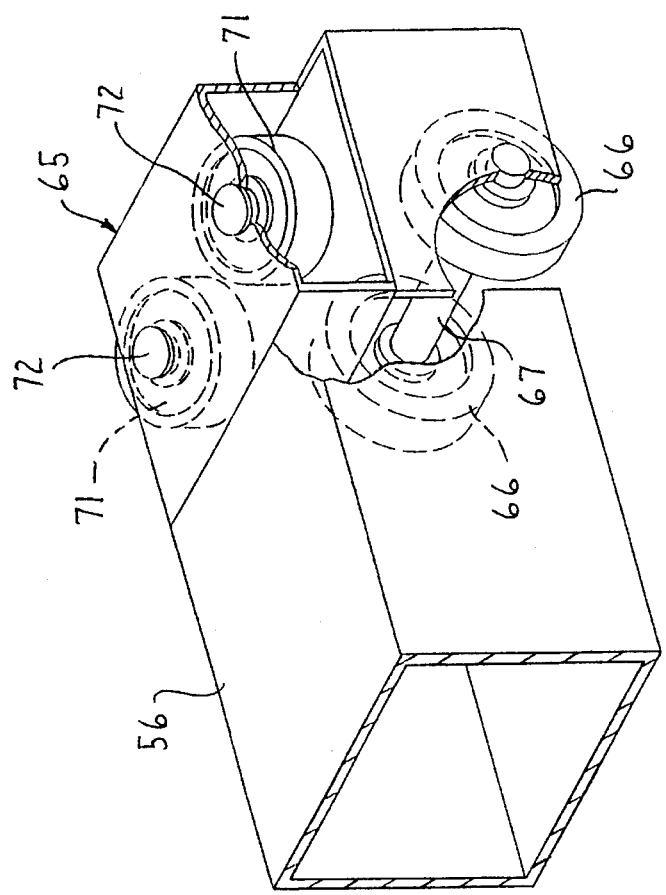
FIG. 8 is a fragmentary perspective view which illustrates the support and guide roller arrangement provided on the rearward free end of each cantilevered side rail as associated with each secondary carriage.
Figure 9:
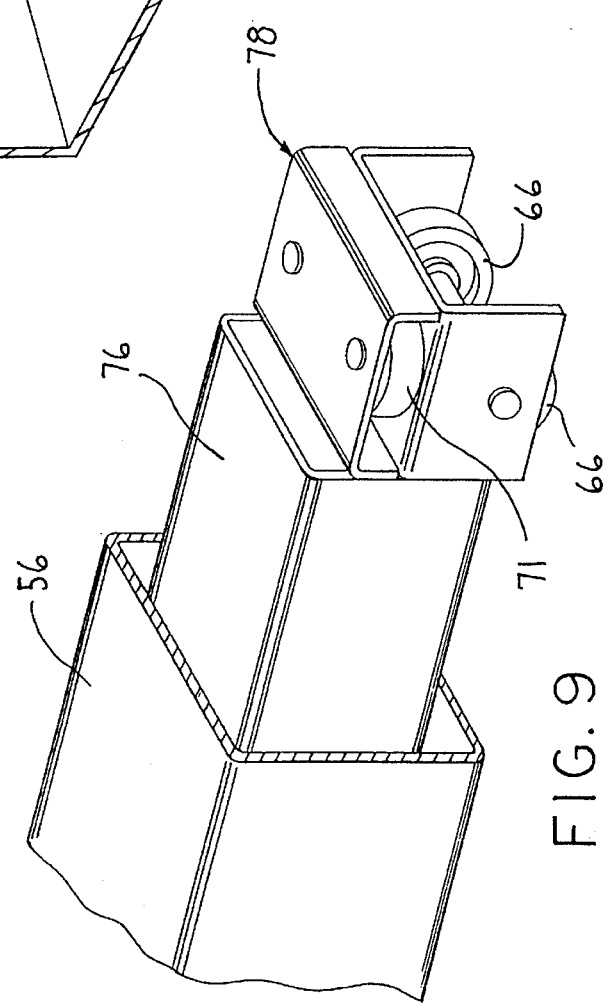
FIG. 9 is a fragmentary sectional view which illustrates the manner in which the support and guide roller arrangement on the secondary carriage is telescopically supported within the respectively adjacent rearward carriage, such as the primary carriage.

This roller arrangement 65, as illustrated in FIG. 8, includes a pair of generally coaxially aligned but sidewardly-spaced support rollers 66 which are rotatably supported for rotation by an axle 67, the axis of which extends horizontally transversely relative to the longitudinal direction of the side frame element, that is perpendicularly with respect to the longitudinally extending centerline of the side frame element 56. The support rollers 66 are disposed so that the lowermost surfaces thereof project at least slightly downwardly below the lowermost exterior surface of the respective side frame element 56, whereby these rollers 66 rollingly engage the inner bottom surface 68 of the respective side frame element 46 so as to provide for rolling support without permitting any significant slidable contact between the telescoped side frame elements.

While the invention illustrates a pair of coaxially-aligned rollers 66, it will be appreciated that in many instances a single such roller, particularly an axially elongated roller, will be sufficient.

The roller arrangement 65 also includes a pair of guide rollers 71 which are supported by individual spindles 72, the axes of which are parallel, vertical and sidewardly-spaced apart. These guide rollers 71 are disposed so that the remote peripheral surfaces thereof project outwardly beyond opposite sides of the side frame member 59, whereby these rollers 71 have a maximum spacing between the outer profiles thereof which is only slightly smaller than the interior width of the side frame element 46 as measured between the side surfaces 73 thereof. These guide rollers 71 are positioned so as to be disposed closely adjacent and hence rollingly engage the opposed side surfaces 73 to thereby rollingly and properly guide the side frame element 56 as it telescopically moves within the side frame element 46.

In this embodiment of the invention, wherein the carriage assembly 14 is provided with both a front and an intermediate carriage, the side frame elements 56 of the intermediate carriage 42 are also formed as hollow elongate members, typically of square or rectangular cross section, so as to telescopically cooperate with the front carriage 43 as described below.

Considering now the front carriage 43, it has a construction which substantially corresponds to the construction of the intermediate carriage 42, which front carriage 43 slidably telescopically cooperates with the intermediate carriage 42 in the same manner as the intermediate carriage slidably telescopically cooperates with the rear carriage 41, as described above.

More specifically, the front carriage 43 is also formed primarily by a U-shaped frame 75 which includes a front frame element 77 which extends horizontally across the bay and adjacent opposite ends thereof is radially joined to a pair of generally parallel side frame elements 76. The side frame elements 76 project longitudinally rearwardly in generally parallel relationship and are cantilevered rearwardly so that rear free ends thereof are provided with supportive and guiding roller assemblies 78 which are constructed generally identical to the assemblies 65 described above, with the assemblies 78 being supportingly and sidewardly guidably telescoped into the respective side frame elements 56 of the intermediate carriage 42. The region between the side frame elements 76, as it extends rearwardly from the front frame element 77, is open.

The frame 75 mounts thereon a pair of front support rollers 81 which are disposed adjacent and positioned downwardly from the front corners of the frame. For this purpose, a support bracket 82 is fixed to and projects downwardly from each end of the front cross frame 77, which bracket 82 mounts thereon a sidewardly cantilevered shaft 83 on which the roller 81 is rotatably supported. The pair of rollers 81 project outwardly from opposite sides of the carriage 43 adjacent the front corners thereof, whereby these rollers 81 are confined between the opposed support tracks 31 and are maintained in supportive rolling engagement with the track surfaces 35.

The U-shaped frame 75 of front carriage 43 also defines a top generally planar support surface for a load, such surface being defined by the upper surfaces 84 of the side and front frame elements.

Figure 6:
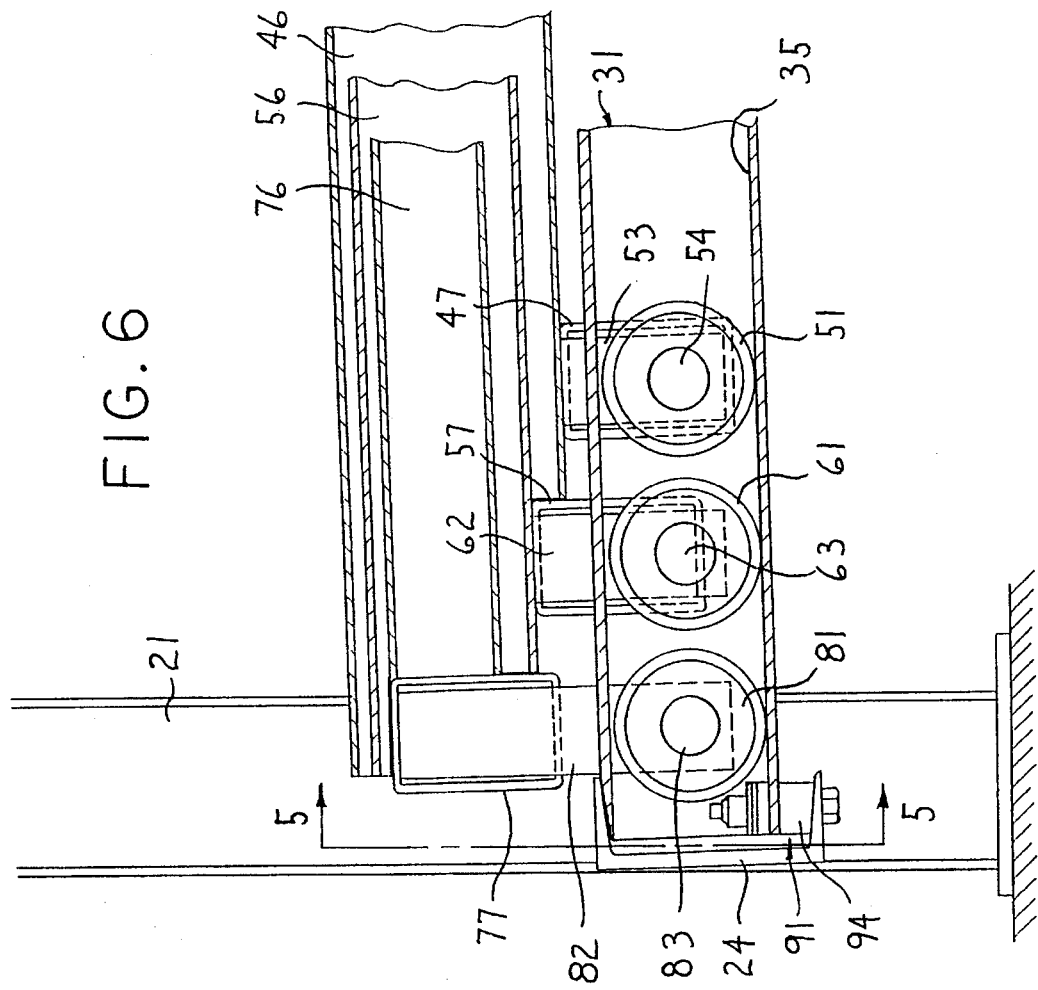
FIG. 6 is a fragmentary sectional view taken generally along line 6—6 in FIG. 5.
Figure 5:
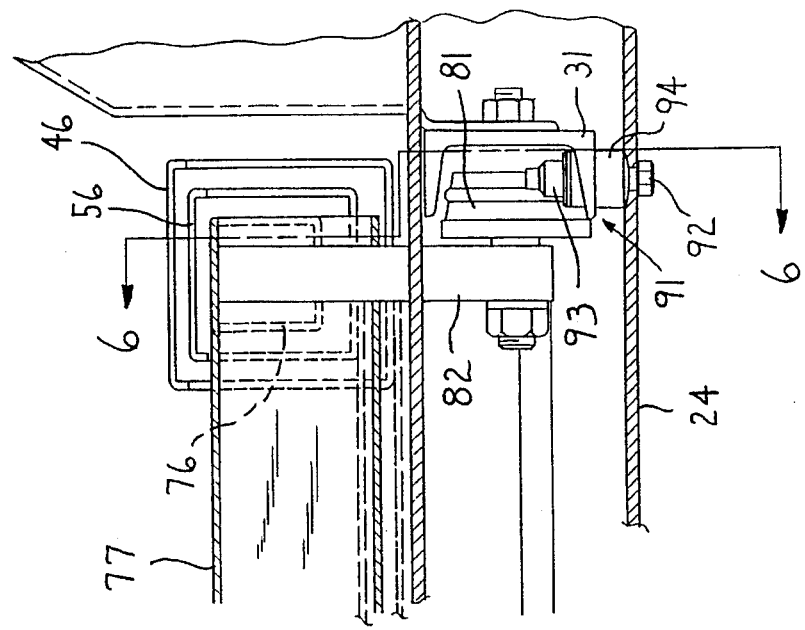
FIG. 5 is an enlarged fragmentary side elevational view, partially in cross section, and showing the front end of the telescoped carriage assembly when in the frontmost position, which view is taken generally along line 5—5 in FIG. 6.

As illustrated by FIGS. 5 and 6, the front rollers 81 of the front carriage 43, the front rollers 61 of the intermediate carriage 42, and the front and rear rollers 51 and 52 of the rear carriage 41, as disposed adjacent opposite sides of the telescopic carriages, are longitudinally aligned with one another in the front-to-rear direction along the bay. All of these rollers as disposed adjacent the respective side of the carriage assembly are maintained in engagement with a single support track, namely the respective track surface 35.

With the rollers all positioned for cooperation with a single support track as described above, then when the three carriages which make up the carriage assembly 14 are telescopically collapsed into engagement with one another, the front rollers of the three carriages are thus disposed in closely aligned relationship one substantially directly behind the other, as illustrated by FIG. 6.

Figure 7:
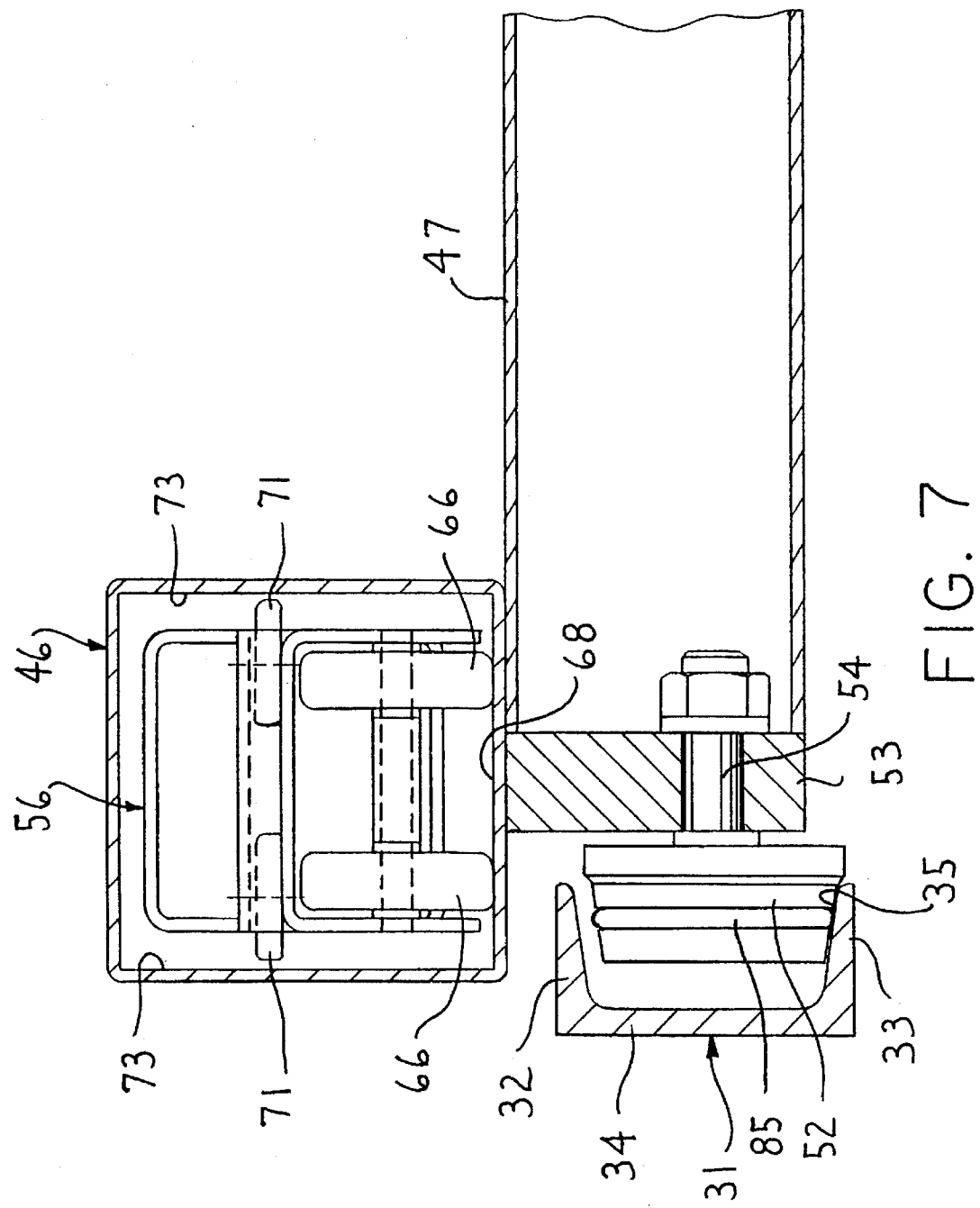
FIG. 7 is an enlarged fragmentary sectional view taken along line 7—7 in FIG. 4.

To improve the rolling characteristics of the carriage rollers along the guide track surfaces 35, the rollers 51, 52, 61 and 81 are all preferably provided with a surrounding annular groove which is of shallow depth, such as of semi-circular cross section, and an endless elastomeric drive ring 85, such as a conventional elastomeric O-ring, is resiliently snapped into the groove in surrounding relationship to the respective roller. This O-ring 85 and the elastomeric resiliency provided by the stiff elastomeric material thereof facilitates a nonslip rolling engagement between the rollers and the guide track surfaces 35. The rollers themselves are conventionally metal rollers, namely steel rollers, and as illustrated by FIGS. 5 and 7 are typically provided with a truncated conical outer annular surface which, in conjunction with the guide track surfaces 35 also being provided with a slight sideward slope, facilitates proper positioning of the carriages on and between the opposed support tracks 31.

In addition, these elastomeric O-rings 85 are highly desirable with respect to the cushioning effect which they provide, particularly when loads are positioned on or removed from the carriages by a forklift. Since this action, particularly when a load is deposited on the carriage, can result in impact or dynamic loads which are transferred through the carriage and thence through the roller bearings and rollers onto the tracks, the elastomeric O-rings are effective in at least partially cushioning these impact or dynamic loads so as to improve the life of the rollers and bearings.

The absorption of shock or impact forces, caused by the depositing of loads on the carriages or directly on the tracks 31, is also preferably minimized by the use of shock-type mountings for securing the tracks 31 to the cross rails 24 and 25. One such shock-type mounting 91 is illustrated in FIGS. 5 and 6 and includes a fastener formed as a bolt 92 which projects upwardly through a lower flange of the cross rail 24 and upwardly through a lower flange of the track 31, which bolt 92 has a suitable fastener such as a nut 93 secured thereto. A shock-absorbing 94 which is formed substantially as an enlarged washer or ring is disposed in surrounding relationship to the bolt 92 and is sandwiched between the opposed flanges on the cross rail 24 and the track 31. This shock-absorbing member 94 is preferably constructed of a fairly stiff elastomeric material so as to provide limited resilient support for the tracks 31, thereby enabling the tracks to provide shock-absorbing capability when a load is deposited by a forklift either onto one of the carriages or directly onto the tracks. This further assists in minimizing wear of the bearings associated with the carriage rollers.

In addition, as illustrated by FIG. 2, each of the carriages associated with the carriage assembly 14 can, if desired, be provided with additional longitudinally-extending frames which slidably and cooperatively telescope together in the same manner as the side frames 46, 56 and 76. The embodiment illustrated by FIG. 2 illustrates the presence of a third such longitudinally extending frame member associated with each carriage, with these third frame members extending parallel to the respective side frames and being disposed substantially along the longitudinally extending centerline of the carriage assembly. These additional frame members provide for increased strength and rigidity of the carriages, and are provided only if required so as to sustain the magnitude of the loads imposed on the carriage assembly.

The operation of the storage rack will now be briefly described.

With the storage bay empty of loads, the rear carriage 41 telescopes over the intermediate carriage 42, which intermediate carriage 42 in turn telescopes over the front carriage 43. The entire collapsed or telescoped carriage assembly 14 in turn is normally urged by gravity downwardly along the tracks 31 so that the telescoped carriage assembly 14 is maintained in a front load-receiving position, this position being designated L1 in FIG. 1, with the telescoped carriage assembly being maintained in this position L1 due to engagement of the front carriage 43 with a suitable stop, such as the front cross rail 24.

When a first load is moved into the storage bay, such as by a conventional forklift, the load will be deposited at load position L1 onto the load-receiving surface of the rear carriage 41.

When a second load is to be loaded onto the storage rack, the second load will be moved into abutment with the front of the load at the position L1. The operator will then drive the forklift inwardly so that the load on the forklift, reacting against the load at position L1, will cause the first load and the rear carriage 41 to be rollingly moved rearwardly into the position L2. The operator then lowers the second load downwardly at position L1 until the second load engages the upper surface of the intermediate carriage 42.

The operator can then move a third load into the storage bay using the same technique described above relative to the second load, whereupon the third load is pushed against the front of the second load and causes the first and second loads and their respective carriages 41 and 42 to be rollingly moved rearwardly into the load positions L3 and L2, respectively. The operator then lowers the third load at position L1 into engagement with the front carriage 43.

A fourth load can then be moved into engagement with the front side of the third load at position L1, and the three loads and the respective carriages are then all pushed rearwardly so that the three loads and the carriages 41, 42 and 43 are thus respectively moved into the load positions L4, L3 and L2. The operator then lowers the fourth load into the load position L1, with this load being deposited directly onto the support tracks 31.

When a load is to be removed from the rack, and assuming the rack is full of loads as described above, then the operator moves a forklift into alignment with the front of the bay, and engages the forklift tines under the front load so as to lift the load upwardly out of engagement with the tracks. As the operator then moves the load forwardly out of the load position L1, the remaining three loads in the bay, due to their being supported on the respective rolling carriages, will roll forwardly by gravity until the next load as mounted on the front carriage 43 moves into the load position L1 and the respective carriage abuts the front stop. Thereafter remaining loads can be removed from the storage rack, and the carriage assemblies will progressively move forwardly until the entire carriage assembly 14 is again in a fully telescoped position as described above.

While the storage rack assembly as described above incorporates a carriage assembly having three telescopic carriages which cooperate with a support track to define a bay for accommodating four loads, it will be appreciated that the carriage assembly can be defined so as to possess only two carriages if desired, or alternatively by suitable design in terms of strength and stiffening, the number of carriages in the overall assembly can be greater than three.

The storage rack assembly of this invention, as described above, requires only a single pair of track surfaces or track members for supporting the plurality of carriages which make up the telescopic carriage assembly, thereby simplifying the overall construction and assembly of the rack structure, and at the same time maintaining an overall compact and simplified structure which eliminates obstructions or interferences with the loads.

Although a particular preferred embodiment of the invention has been disclosed in detail for illustrative purposes, it will be recognized that variations or modifications of the disclosed apparatus, including the rearrangement of parts, lie within the scope of the present invention.

The invention claimed is:

1. In a storage rack arrangement for permitting a plurality of loads to be disposed closely adjacent in aligned front-to-back relationship longitudinally along a generally horizontally elongated storage bay, said storage rack arrangement including a frame which defines said storage bay and which has a pair of generally parallel support tracks fixedly mounted thereon and disposed adjacent opposite sides of the bay, said support tracks being elongated longitudinally along the bay in the front-to-back direction and being slightly downwardly inclined as the support tracks project toward a front of the bay, and a telescoping carriage assembly movably mounted on the support tracks and including at least front and rear carriages which are each adapted to have a load mounted thereon when the front and rear carriages are in an extended position, comprising the improvement wherein:

said rear carriage includes generally parallel side frame elements which are longitudinally elongated, said side frame elements being hollow and being open at front ends thereof; and said front carriage includes a generally rearwardly-opening U-shaped frame defined by a front cross frame member which extends sidewardly of the bay and which adjacent opposite ends is rigidly joined to a pair of generally parallel elongated side frame members which are cantilevered rearwardly and which are slidably telescopically engaged and supported within the hollow side frame elements of the rear carriage.

2. A storage rack arrangement according to claim 1, including a supporting and guiding roller arrangement mounted on each of said side frame members adjacent a rear free end thereof, said supporting and guiding roller arrangement being respectively rollingly and guidingly engaged within the respective side frame element of the rear carriage.

3. A storage rack arrangement according to claim 1, wherein said pair of support tracks define thereon a single pair of guide surfaces which extend longitudinally along the support tracks in generally parallel relationship adjacent opposite sides of the bay, said front carriage defining thereon a pair of front rollers disposed adjacent but below front corners thereof and maintained in direct supportive and rolling engagement with said pair of guide surfaces, said rear carriage including pairs of front and rear rollers mounted thereon adjacent opposite sides thereof in the vicinity of the respective front and rear corners, the front and rear rollers of said rear carriage also being maintained in supportive and rolling engagement with said pair of guide surfaces.

4. A storage rack arrangement according to claim 3, including a supporting and guiding roller arrangement mounted on each of said side frame members adjacent a rear free end thereof, said supporting and guiding roller arrangement being respectively rollingly and guidingly engaged within the respective side frame element of the rear carriage.

5. A storage rack arrangement according to claim 4, wherein said carriage assembly includes a third carriage adapted to have a load supported thereon, said third carriage including a generally rearwardly-opening U-shaped frame having a pair of generally parallel and rearwardly-cantilevered side frame elements which are telescopically supported and guided within hollow side frame members of said front carriage, whereby said front carriage is longitudinally positioned between said third carriage and said rear carriage when said carriage assembly is in an extended position due to each of said carriages having a load disposed thereon.

* * * * *